US007117206B1

(12) United States Patent
Bharat et al.

(10) Patent No.: US 7,117,206 B1
(45) Date of Patent: ***Oct. 3, 2006

(54) METHOD FOR RANKING HYPERLINKED PAGES USING CONTENT AND CONNECTIVITY ANALYSIS

(75) Inventors: Krishna Asur Bharat, Santa Clara, CA (US); Monika R. Henzinger, Menlo Park, CA (US)

(73) Assignee: Overture Services, Inc., Pasadena, CA (US)

( * ) Notice: Subject to any disclaimer, the term of this patent is extended or adjusted under 35 U.S.C. 154(b) by 370 days.

This patent is subject to a terminal disclaimer.

(21) Appl. No.: 10/429,237

(22) Filed: May 5, 2003

Related U.S. Application Data

(63) Continuation of application No. 09/007,635, filed on Jan. 15, 1998, now Pat. No. 6,738,678.

(51) Int. Cl.
*G06F 17/30* (2006.01)
(52) U.S. Cl. .................... 707/5; 707/3; 707/7; 707/102
(58) Field of Classification Search .................... 707/5, 707/3, 7, 102
See application file for complete search history.

(56) References Cited

U.S. PATENT DOCUMENTS

| | | | |
|---|---|---|---|
| 5,301,317 A | 4/1994 | Lohman et al. | 395/600 |
| 5,442,784 A | 8/1995 | Powers et al. | 395/600 |
| 5,495,604 A | 2/1996 | Harding et al. | 395/600 |
| 5,761,493 A | 6/1998 | Blakelye et al. | 395/604 |
| 5,848,407 A * | 12/1998 | Ishikawa et al. | 707/2 |
| 5,873,081 A | 2/1999 | Harel | 707/3 |
| 5,937,422 A | 8/1999 | Nelson et al. | 707/531 |
| 5,953,718 A | 9/1999 | Wical | 707/5 |
| 6,112,203 A * | 8/2000 | Bharat et al. | 707/5 |
| 6,285,999 B1 * | 9/2001 | Page | 707/5 |

OTHER PUBLICATIONS

Kleinberg, "Authoritative Sources in a Hyperlinked Environment," Proc. Of ACM-SIAM Symposium on Discrete Algorithms, 1998 (to appear). Also appears as IBM Research Report RJ 10076, May 1997.
Frakes et al., "Information Retrieval, Data Structures and Algorithms," Prentice Hall, Englewood Cliffs, New Jersey 07632.

* cited by examiner

*Primary Examiner*—Frantz Coby
*Assistant Examiner*—Camlinh Nguyen
(74) *Attorney, Agent, or Firm*—Brown, Raysman, Millstein, Felder & Steiner

(57) ABSTRACT

A computerized method determines the ranking of documents including information content. The present method uses both content and connectivity analysis. An input set of documents is represented as a neighborhood graph in a memory. In the graph, each node represents one document, and each directed edge connecting a pair of nodes represents a linkage between the pair of documents. The input set of documents represented in the graph is ranked according to the contents of the documents. A subset of documents is selected from the input set of documents if the content ranking of the selected documents is greater than a first predetermined threshold. Nodes representing any documents, other than the selected documents, are deleted from the graph. The selected subset of documents is ranked according the linkage of the documents, and an output set of documents exceeding a second predetermined threshold is selected for presentation to users.

17 Claims, 2 Drawing Sheets

METHOD FOR RANKING HYPERLINKED PAGES USING CONTENT AND CONNECTIVITY ANALYSIS

CROSS-REFERENCE TO RELATED APPLICATIONS

This patent application is a continuation of U.S. patent application Ser. No. 09/007,635, filed on Jan. 15, 1998 now U.S. Pat. No. 6,738,678, entitled "Method For Ranking Hyperlinked Pages Using Connectivity And Content Analysis", which is hereby incorporated by reference in its entirety.

FIELD OF THE INVENTION

This invention relates generally to computerized information retrieval, and more particularly to ranking documents having related content.

BACKGROUND OF THE INVENTION

It has become common for users of client computers connected to the World Wide Web (the "Web") to employ Web browsers and search engines to locate Web pages having content of interest. A search engine, such as Digital Equipment Corporation's AltaVista search engine, indexes hundreds of millions of Web pages maintained by server computers all over the world. The users compose queries to specify a search topic, and the search engine identifies pages having content that satisfies the queries, e.g., pages that match on the key words of the queries. These pages are known as the result set.

In many cases, particularly when a query is short or not well defined, the result set can be quite large, for example, thousands of pages. For this reason, most search engines rank order the result set, and only a small number, for example twenty, of the highest ranking pages are actually returned at a time. Therefore, the quality of search engines can be evaluated not only on the number of pages that are indexed, but also on the usefulness of the ranking process that determines which pages are returned.

Sampling of search engine operation has shown that most queries tend to be quite short, on the average about 1 to 2 words. Therefore, there is usually not enough information in the query itself to rank the pages of the result set. Furthermore, there may be pages that are very relevant to the search that do not include the specific query words. This makes ranking difficult.

In Information Retrieval, some approaches to ranking have used relevance feedback supplied by users. This requires the user to supply feedback on the relevance of some of the results that were returned by the search in order to iteratively improve ranking. However, studies have shown that users of the Web are reluctant to provide relevance feedback.

In one prior art technique, an algorithm for connectivity analysis of a neighborhood graph (n-graph) is described, J. Kleinberg, "Authoritative Sources in a Hyperlinked Environment," Proc. 9th ACM-SIAM Symposium on Discrete Algorithms, 1998, and also in IBM Research Report RJ 10076, May 1997. The algorithm analyzes the link structure, or connectivity of Web pages "in the vicinity" of the result set to suggest useful pages in the context of the search that was performed.

The vicinity of a Web page is defined by the hyperlinks that connect the pages. A Web page can point to other pages, and the page can be pointed to by other pages. Close pages are directly linked, farther pages are indirectly linked. These connections can be expressed as a graph where the nodes represent the pages, and the directed edges represent the links.

Specifically, the algorithm attempts to identify "hub" and "authority" pages. Hubs and authorities exhibit a mutually reinforcing relationship, a good hub page is one that points to many good authorities, and a good authority page is pointed to be many good hubs. Kleinberg constructs a graph for a specified base set of hyperlinked pages. Using an iterative algorithm, an authority weight x and a hub weight y is assigned to each page when the algorithm converges.

When a page points to many pages with large x values, the page receives a large y value and is designated as a hub. When a page is pointed to by many pages with large y values, the page receives a large x value and is designated as an authority. The iterative weights can beranked to compute "strong" hubs and authorities.

However, there are some problems with the Kleinberg's algorithm which is strictly based on connectivity. First, there is a problem of topic drift. For example, a user composes a query including the key words "jaguar" and "car." The graph will tend to have more pages that talk about "cars" than specifically about "jaguars". These self-reinforcing pages will tend to overwhelm pages mentioning "jaguar" to cause topic drift.

Second, it is possible to have multiple "parallel" edges connected from a certain host to the same authority or the same hub. This occurs when a single Web site stores multiple copies or versions of pages having essentially the same content. In this case, the single site has undue influence, hence, the authority or hub scores may not be representative.

Therefore, it is desired to provide a method which precisely identifies the content of pages related to a topic specified in a query without having a local concentration of pages influence the outcome.

SUMMARY OF THE INVENTION

Provided is a method for ranking documents including information content. The method can be used to rank documents such as Web pages maintained by server computers connected to the World Wide Web. The method is useful in the context of search engines used on the Web to rank result sets generated by the search engines in response to user queries. The present ranking method uses both content and connectivity analysis.

The method proceeds as follows. An input set of documents is represented as a neighborhood graph in a memory. In the graph, each node represents one document, and each directed edge connecting a pair of nodes represents a linkage between the pair of documents. A particular document can point to other documents, and other documents can point to the particular document. There are no edges between documents on the same site.

The input set of documents represented in the graph is ranked according to the content of the documents based on their match to a certain topic. Ranking can be done using either a vector space model or a probabilistic model. A subset of documents is selected from the input set of documents if the content ranking of the selected documents is greater than a first predetermined threshold. Nodes representing any documents, other than the selected documents, are deleted from the graph.

The selected subset of documents is ranked according to the linkage of the documents, and an output set of documents exceeding a second predetermined threshold is selected for presentation to users.

In one aspect of the invention, the input set of documents includes a result set of Web pages generated by a Web search engine in response to a user query, and pages directly linked to the result set. The rank of a particular document is based on the similarity of the content of the particular document and the content of a base set of documents. The base set can be the result set of pages returned by the search engine, or any other set of documents that has a representative content.

The first threshold can be the median content ranking of the input set of documents, a fraction of the maximum content score, or some absolute value. Alternatively, the threshold can be determined interactively, or from the slope of a graph that plots ranking versus the measured content ranking.

In another aspect of the invention, the connectivity ranking is a computed weight based on the number of edges that connect a node representing a particular document. The weight can be adjusted downward for edges connecting nodes representing documents stored at the same site.

DETAILED DESCRIPTION OF THE PREFERRED EMBODIMENT

System Overview

Figure 1:
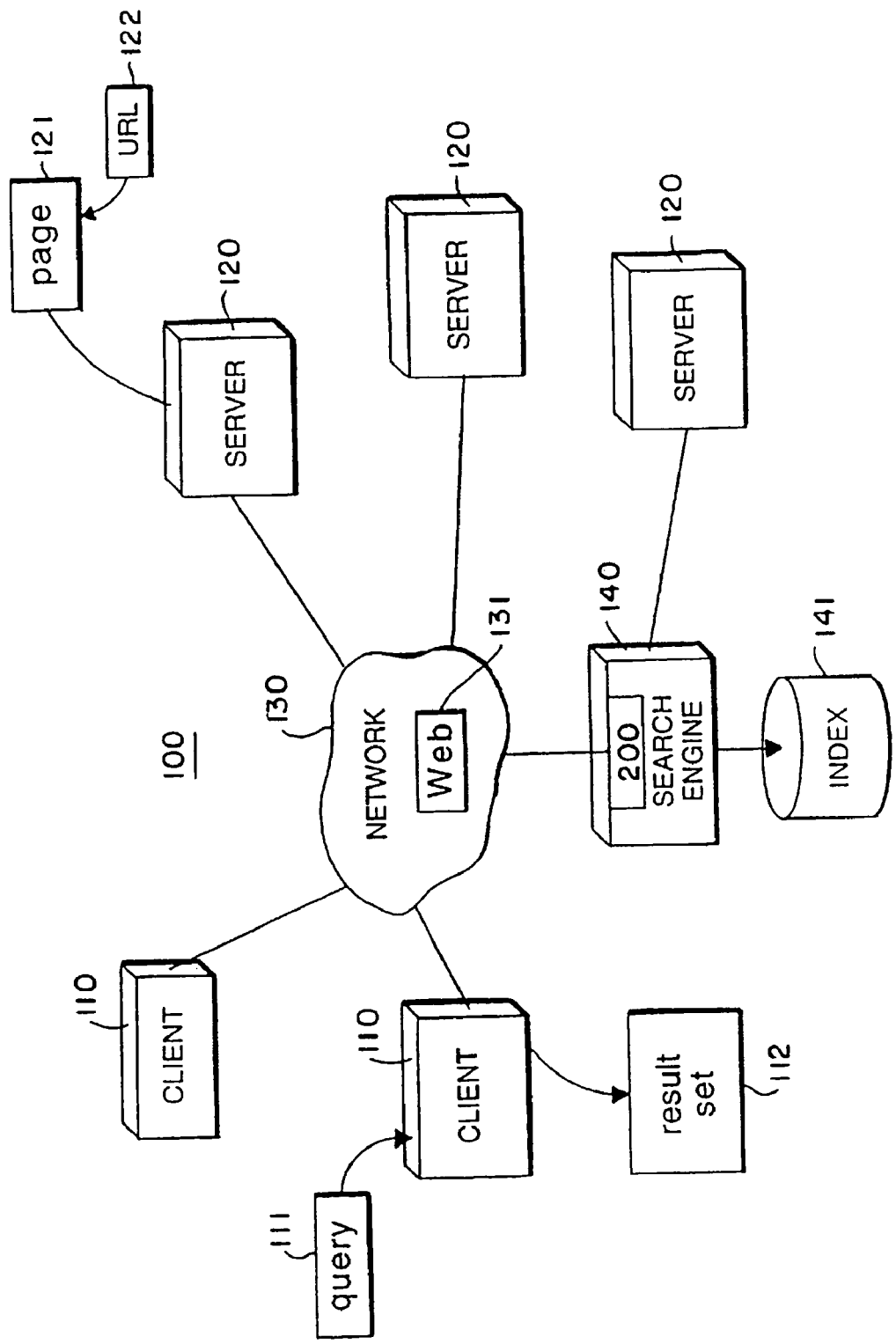
FIG. 1 is a block diagram of a client-server distributed network that uses the invention.

FIG. 1 shows a distributed network of computers 100 that can use our invention. Client computers 10 and server computers 120 are connected to each other by a network 130, for example, the Internet. The network 130 includes an application level interface called the Word Wide Web (the "Web").

The Web allows the clients 110 to access documents, for example, multimedia pages 121 maintained by the servers 120. The locations of each page 121 is indicated by an associated Universal Resource Locator (URL) 122. Although the invention is described with respect to documents that are Web pages, it should be understood that the invention can be worked with any type of linked data objects whose content can be characterized.

In order to help users locate Web pages of interest, a search engine 140 maintains an index 141 of Web pages in a memory, for example, disk storage. In response to a query 111 composed by a user, the search engine 140 returns a result set 112 which satisfies the terms of the query 111. Because the search engine 140 stores many millions of pages, the result set 112, particularly when the query 111 is loosely specified, can include a large number of qualifying pages. Therefore, the order in which the result set is presented to the client 110 is indicative of the usefulness of the search engine.

We provide a method 200 that can be implemented as part of the search engine 140. Alternatively, the method 200 can be implemented by one of the clients 110. Our method uses content analysis as well as connectivity analysis to improve the ranking of pages in the result set 112. As an introduction, our method includes the following general steps.

We intercept the result set generated by the search engine either at the search engine or at the client, and begin by constructing a graph in a memory that represents the linkage of the pages that satisfy a particular user query and other pages linked to these pages. Next, we prune the graph so that only pages which specifically relate to the topic implied by the query are represented. Finally, the connectivity of the pruned graph is scored to determine the ranking of the pages of the result. Only pages whose content and connectivity ranking exceeds predetermined thresholds are returned to the user.

Constructing Nodes and Edges of an N-Graph

Figure 2:
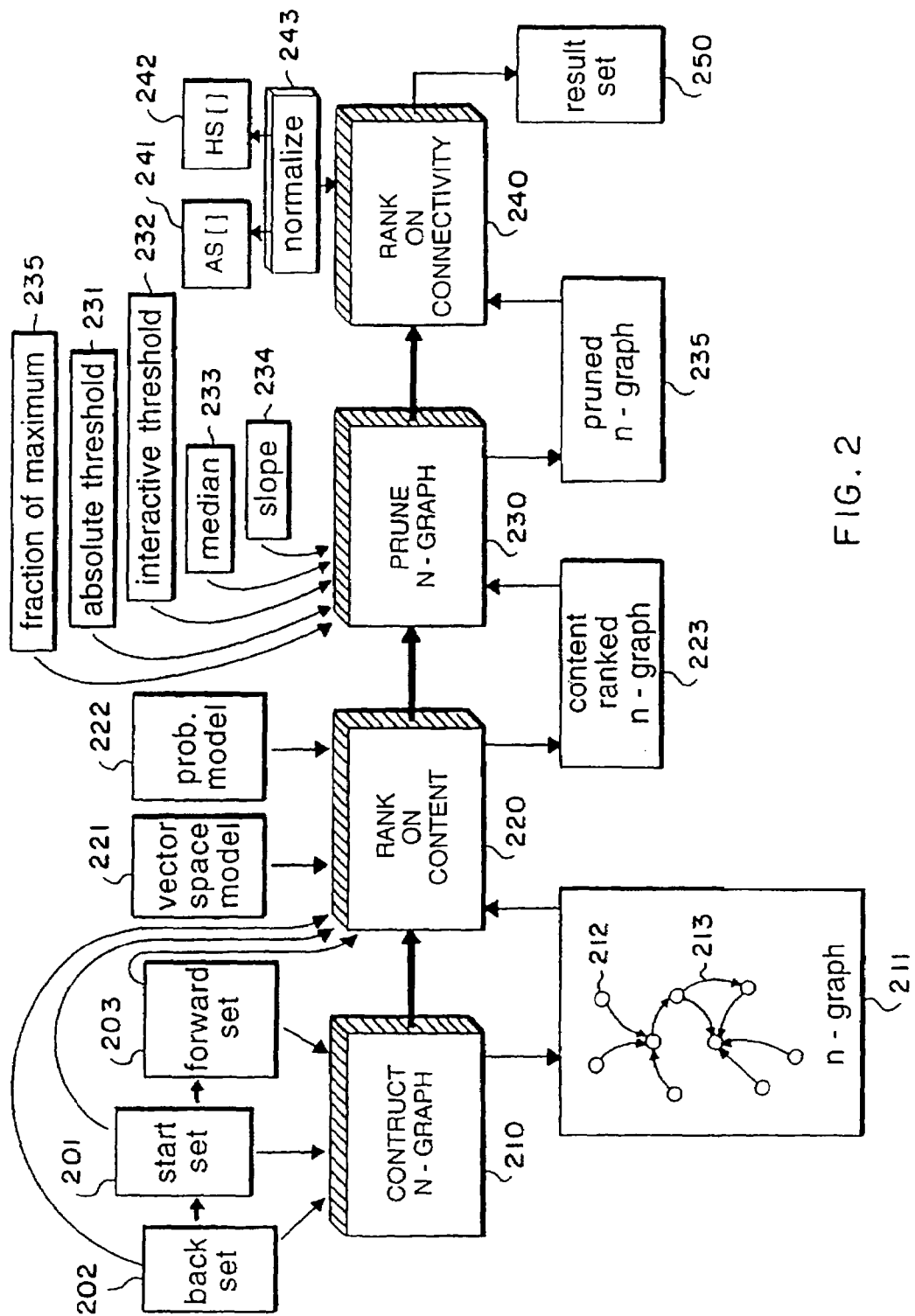
FIG. 2 is a flow diagram of a method that precisely ranks documents according to the preferred embodiment of the invention.

FIG. 2 illustrates the details of the computer implementable method 200 according to our invention. An input data structure to our method includes a start set of pages 201. As stated above, the input can be any type of linked data objects, text, video, audio, or just binary data. The start set 201 includes pages that related to some arbitrary topic. The set 201 is typically derived from a search engine query, for example, an AltaVista query "+jaguar+car." In step 210, we use the start set 201 to build a neighborhood graph 211 of nodes 212 and directed edges 213, also known as the "n-graph." In the n-graph, each node represents a page and each directed edge represents a hyperlink from one page to another. We construct the nodes 212 of the n-graph 211 first, and add the edges 213 later.

For every start set node, we locate pages that point to it. We call this set of pages the back set 202. With the AltaVista search engine, "link:URL" queries can be used to identify such pages for each start set page located at a given URL. We add one node to the n-graph 211 for each back set page. Similarly, pages pointed to be the start set pages are located. This can be done by fetching each start set page and extracting the hyperlinks from each page. These pages constitute the forward set 203 for which nodes are added to the n-graph. As a result, the input set of documents includes pages which did not directly satisfy the query. At this stage, the n-graph 211 has nodes but no edges. If a larger graph is needed, the process can be repeated several times to add nodes that are directly linked to the newly added nodes.

After we have constructed the nodes for the start, back, and forward sets, we add the directed edges 213. For each node in the n-graph 211, the corresponding Web page is fetched and all outgoing hyperlinks of the fetched pages are examined. If a hyperlink points to a page that is also part of the n-graph and both pages are on different server computers, then a corresponding edge is added to the graph. Nodes representing pages on the same server are not linked. This prevents a single Web site with many self-referencing pages to unduly influence the outcome. This completes the n-graph 211.

Content Analysis

Next, we identify nodes in the n-graph 211 that match well on the topic implied by the query. These nodes are retained, and nodes that do not match well are deleted from the graph. Deleting nodes results in a pruned graph. Given the example query "+jaguar+car," pruning will prevent pages that deal with cars in general from dominating the graph and influencing the outcome as in the prior art.

Ranking Pages According to Content

In order to identify pages (nodes) to retain, we first need to determine the "topic." As mentioned above, users tend to compose short queries and are reluctant to volunteer extra information. Hence, queries and users will generally be of no help in defining the topic. One can almost certainly conclude that the topic is broader than just the words of the query, and not as broad as the whole n-graph, including nodes representing the start, back, and forward sets. As a compromise, we take the pages in the start set 201 to define the topic.

In step 220, we rank nodes in n-graph 211 according to their closeness to the topic defined by the pages of the start set 201. Various document similarity measuring techniques have been developed in Information Retrieval to determine the goodness of fit between a "target" document and a collection of documents. These techniques typically measure a similarity score based on word frequencies in the collection and target document.

There are two popular approaches in Information Retrieval, the "Vector Space Model" 221, and the "Probabilistic Model" 222. With the vector space model 221, the documents in the collection and the target document can all be regarded as vectors in an n-dimensional vector space, where n corresponds to the number of unique terms in the data set. A vector matching operation based on cosine of the angle between the vectors is used to compute document similarity, see for example, Salton et al., "Term-Weighting Approaches in Automatic Text Retrieval,", Information Processing and Management, 24(5), 513–23, 1988.

The probabilistic model 222 is described by Croft et al. in "Using Probabilistic Models of Document Retrieval without Relevance Feedback," Documentation, 35(4), 285–94, 1979. For a survey of ranking techniques in Information Retrieval see Frakes et al., "Information Retrieval: Data Structures & Algorithms," Chapter 14—'Ranking Algorithms,' Prentice-Hall, NJ, 1992.

Pruning the Graph

As mentioned above, a document similarity measure can be used to rank documents according to their match to a suitably defined topic. The graph is pruned in step 230 by only retaining nodes that are above a first predetermined threshold in terms of similarity score, nodes that are below the threshold are deleted from the graph. There are several ways to pick a similarity threshold:

Median Score: The simplest approach is to retain some fixed fraction of the nodes, e.g., 50%. In this case, the median score 233 of the n-graph 211 can be used as the threshold. This simple scheme appears to work quite well in practice. For stronger pruning, the median score of the start set can be used instead to define the threshold.

Absolute Threshold: Alternatively, we can use an absolute threshold 231 when it is meaningful to do so given the similarity measurements. The distribution of scores often depends on the size of the collection and the number of features (usually this means terms) used in the similarity computation. The larger the set of features, the smaller similarity scores tend to be. Hence, an absolute threshold may not work.

Slope Based Approach: Here in substep 234 the idea is to find a natural point to partition the ranked list of nodes based on score. We plot a graph of score versus rank. We then locate a sharp drop in slope of the graph and use the score at that point as the threshold.

Fraction of Maximum Score: In this approach, substep 235, some fraction of the maximum content score (e.g., $1/10^{th}$) is used as the threshold.

Interactive Control: Using the computation described in the next section it is feasible to compute useful pages from the pruned graph quite quickly, at almost interactive speeds. Hence another option 232 would be to give the user dynamic control over the similarity threshold, allowing them to find a good ranking interactively. For each setting the system will display a corresponding ranking. If the display shows the titles of the documents and a short summary for each, the user can visually ascertain if the ranking is satisfactory. Starting with a suitable initial threshold the user should be able to find a good threshold in just a few steps. Another interactive option would be to precompute rankings for a few thresholds corresponding to a set of percentiles, and allow the user to choose interactively between these rankings.

Determining Useful Hubs and Authorities

We use a modified Kleinberg algorithm, describe above, on the nodes of the pruned n-graph to determine useful hub and authority pages in step 230. For each node of the pruned n-graph, we measure two scores: a hub score (HS), which estimates how good a hub the page is, and an authority score (AS), which estimates how good an authority the page is. The intuition behind our method is this: A good hub is one that points to many documents. A good authority is one that is pointed to by many documents. Transitively, an even better hub is one that points to many good authorities, and an even better authority is one that is pointed to by many good hubs.

We maintain two arrays HS[i] 241 and ASU[j] 242 to do the recursive hub and authority computations. Here, i and j are indexed by the nodes of our pruned n-graph. Initially, all HS and AS entries are set to 1. The entries are normalized after each iterations. When the normalized arrays stabilize, the computation has converged. During each iteration for all nodes i and j, we determine weighted counts:

$AS[i] = \Sigma HS[q]*Weight1(q,i)$; with $q$ such that $(q,i)$ is an edge $HS[j] = \Sigma AS[q]*Weight2(j,q)$; with $q$ such that $(j,q)$ is an edge In Kleinberg's algorithm, the Weight1(a, b) and Weight2 (a, b) are always 1. In our modified method, we use the following weights to prevent pages maintained by a single server from driving up scores in parts of the graph. Weight1 (q,i)=1/k, where k is the number of pages with links to page i that are on the same server as page q. This prevents pages of a single server to unduly drive up the authority score. Similarly, Weight2(j,q)=1/k, where k is the number of pages pointed to by node j that are on the same server as page q. Note that Weight1( ) and Weight2( ) are in the half open interval (0..1], and not fixed to 1 as in the prior art.

Upon completion, AS and HS contain good estimates of the utility of each page as an authority and as a hub on the topic. We use these scores to rank the nodes in the graph. The top, for example, ten nodes based on AS and HS scores constitute the most promising authorities and hubs in the graph respectively. Pages representing these nodes can be presented to the user in the same manner as search engine results, i.e., Title, URL, Abstract and Score. Usually ten iterations produce a stable ranking for AS and HS, and 50 iterations produces convergence.

Alternative Embodiments

In an alternative embodiment, instead of using the start set 201 to determine the topic, the user specifies a topic in addition to the query. The topic can be categories as maintained by the Yahoo indexing service. Each of these categories is a collection of documents, and hence amenable to the same sort of similarity computation as described above.

The topic can even be expressed as a logical combination of categories, e.g., Soccer AND NOT American_Football. Given such an expression, we determine a similarity score for the expression from the similarity score of the parts. For AND we use the plus (+) operator, and for AND NOT, we use the minus (−) operator. With the given example, we determine:

Similarity_Score(Soccer AND NOT American_Football)=Similarity_Score(Soccer)−Similarity_Score(American_Football).

Our method is distinguishable because we perform content analysis before connectivity analysis. The content analysis limits the connectivity analysis to a graph that is considered relevant to the topic of the search. Our method works effectively in cases where Kleinberg's algorithm fails. Also, our method can be worked without relevancy feedback from users.

Our invention limits topic drift by considering content as well as connectivity of pages. In addition, our method prevents multiple closely linked pages stored at a single Web site unduly influencing the outcome. Our method may also consider proximal pages not directly satisfied by the query. These pages may, nonetheless, be relevant.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

We claim:

1. A computer implemented method for ranking linked data objects containing information content, the method comprising the steps of:
   generating an input set of linked data objects based upon a topic, each of the linked data objects having at least one link to another linked data object;
   ranking the linked data objects in the input set based at least in part upon their closeness to the topic;
   generating a subset of linked data objects from the input set of linked data objects having a closeness ranking greater than a first predetermined threshold;
   ranking the linked data objects in the subset based at least in part upon their links; and
   generating an output set of linked data objects from the subset of linked data objects having a link ranking greater than a second predetermined threshold.

2. The method of claim 1, wherein the step of generating an input set of linked data objects comprises the step of generating a start set of linked data objects based at least in part upon a result of a search engine query.

3. The method of claim 2, wherein the step of generating an input set of linked data objects further comprises the steps of:
   locating linked data objects having links directed to linked data objects in the start set of linked data objects; and
   adding the located linked data objects to the linked data objects in the start set of linked data objects.

4. The method of claim 2, wherein the step of generating an input set of linked data objects further comprises the steps of:
   locating linked data objects having links directed from linked data objects in the start set of linked data objects; and
   adding the located linked data objects to the linked data objects in the start set of linked data objects.

5. The method of claim 2, wherein the first predetermined threshold is a median closeness ranking of the start set of linked data objects.

6. The method of claim 1, wherein the step of ranking the linked data objects in the input set comprises the step of generating a similarity score for each of the linked data objects in the input set based upon the similarity of the information content of each of the linked data objects to the information content of a collection of linked data objects.

7. The method of claim 6, wherein the similarity is measured according to a vector space model.

8. The method of claim 6, wherein the similarity is measured according to a probabilistic model.

9. The method of claim 1, wherein the first predetermined threshold is a median closeness ranking of the input set of linked data objects.

10. The method of claim 1, wherein the first predetermined threshold is a fixed.

11. The method of claim 1, wherein the first predetermined threshold is determined interactively.

12. The method of claim 1, wherein the first predetermined threshold is determined from the slope of a graph plotting closeness ranking scores versus closeness ranking levels.

13. The method of claim 1, wherein the first predetermined threshold is a fraction of a maximum closeness score of the input set of linked data objects.

14. The method of claim 1, wherein the step of ranking the linked data objects in the subset comprises the steps of:
   generating a hub score for each linked data object in the subset; and
   generating an authority score for each linked data object in the subset.

15. The method of claim 14, wherein the step of generating a hub score for a first linked data object comprises the step of multiplying the authority score of a second linked data object by a link weight that is calculated based upon the number of linked data objects having links directed from the first linked data object that are located on a server common to the second linked data object.

16. The method of claim 14, wherein the step of generating an authority score for a first linked data object comprises the step of multiplying the hub score of a second linked data object by a link weight that is calculated based upon the number of linked data objects having links directed to the first linked data object that are located on a server common to the second linked data object.

17. The method of claim 14, wherein the link ranking for each linked data object in the subset is determined based at least in part upon the hub score and the authority score for each linked data object in the subset.

* * * * *